(12) United States Patent
Moon et al.

(10) Patent No.: US 10,321,483 B1
(45) Date of Patent: Jun. 11, 2019

(54) MID-PACKET DETECTION IN WIRELESS LAN

(71) Applicant: NEWRACOM, INC., Irvine, CA (US)

(72) Inventors: Sungho Moon, Irvine, CA (US); Dae Won Lee, Irvine, CA (US); Young Hoon Kwon, Irvine, CA (US)

(73) Assignee: NEWRACOM, INC., Lake Forest, CA (US)

(*) Notice: Subject to any disclaimer, the term of this patent is extended or adjusted under 35 U.S.C. 154(b) by 346 days.

(21) Appl. No.: 15/085,336

(22) Filed: Mar. 30, 2016

Related U.S. Application Data

(60) Provisional application No. 62/140,321, filed on Mar. 30, 2015.

(51) Int. Cl.
*H04W 74/08* (2009.01)
*H04W 24/08* (2009.01)
*H04W 84/12* (2009.01)

(52) U.S. Cl.
CPC ....... *H04W 74/0808* (2013.01); *H04W 24/08* (2013.01); *H04W 84/12* (2013.01)

(58) Field of Classification Search
CPC . H04W 24/08; H04W 84/12; H04W 74/0825; H04W 74/0816
See application file for complete search history.

(56) References Cited

U.S. PATENT DOCUMENTS

| | | | |
|---|---|---|---|
| 2011/0205923 A1* | 8/2011 | Doll | H04W 24/10 370/252 |
| 2015/0071215 A1* | 3/2015 | Tian | H04W 24/08 370/329 |
| 2015/0172038 A1* | 6/2015 | Jiang | H04L 5/143 370/280 |
| 2017/0325266 A1* | 11/2017 | Kim | H04W 74/0833 |

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Andrew Lai
*Assistant Examiner* — M Mostazir Rahman

(57) ABSTRACT

A transmitting device may perform mid-packet detection (MPD) in a wireless channel by receiving a signal from the wireless channel, detecting first symbols having a first symbol duration in the signal during a first detection window, and detecting second symbols having a second symbol duration in the signal during a second detection window. The first and second symbol durations, excluding CPs, may be 3.2 and 12.8 microseconds respectively. A transmitting device may perform MPD in a wireless channel by receiving a signal from the channel, performing an MPD of symbols in the signal, producing first and second comparison result by comparing an output of the MDP to respective first and second thresholds, and determine whether to transmit a frame using the first comparison result and the second comparison result.

19 Claims, 9 Drawing Sheets

(56) References Cited

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

* cited by examiner

MID-PACKET DETECTION IN WIRELESS LAN

CROSS-REFERENCE TO RELATED APPLICATION

This application claims the benefit of U.S. Provisional Application No. 62/140,321, filed on Mar. 30, 2015.

BACKGROUND

1. Technical Field

The technology described herein relates generally to wireless networking. More particularly, the technology relates to Clear Channel Assessment (CCA) in Wireless Local Area Network (WLAN).

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (hereinafter, IEEE Std 802.11). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (hereinafter, IEEE 802.11ac).

Recently, an amendment focused on providing a high efficiency WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

Wireless communication devices use Clear Channel Assessment (CCA) to assess the availability of a medium. CCA may include one or more of signal detect CCA, energy detect CCA, and mid-packet detection (MPD) CCA.

In signal detect CCA, also known as preamble detect CCA, a wireless device detects the presence of a WLAN frame in the medium. In particular, the device looks for a preamble of the WLAN frame supporting an IEEE 802.11 standard. As implemented in the IEEE 802.11ac standard, a device may be capable of detecting a preamble of a valid OFDM frame in a 20 MHz primary channel with a power level at or above −82 decibels relative to 1 milliwatt (i.e., −82 dBm) with greater than 90% reliability within 4 microseconds (μs). The channel is determined to be busy when the preamble is detected. A legacy preamble of the OFDM frame ensures that preamble detect CCA is compatible with older wireless technologies.

Energy detect CCA is used in both the primary and secondary channels. In energy detect CCA under the 802.11 standard, if a device detects a signal at or above −62 dBm within 4 μs, the device determines that the medium is busy. The detected signal need not be a WLAN frame.

Mid-packet detection (MPD) is specified in the IEEE 802.11ac standard to detect the presence of a packet in the secondary channel. In particular, the IEEE 802.11ac standard specifies that mid-packet CCA should detect any part of a packet with a power level at or above −72 dBm with greater than 90% reliability within 25 μs. As indicated by the name, mid-packet detection does not rely on detecting a preamble of the frame, and instead detects any part of the frame. Mid-packet detection techniques include techniques that rely on the structure of symbols of the frame when detecting the frame.

As symbol lengths used in wireless frames increase, mid-packet detection may become more difficult, and current techniques may have difficulty providing adequate mid-packet detection performance.

SUMMARY

In an embodiment, a method implemented by a transmitting device for performing mid-packet detection in a wireless channel comprises receiving, by the transmitting device, a signal from the wireless channel, detecting one or more first symbols having a first symbol duration in the signal during a first detection window, and detecting one or more second symbols having a second symbol duration in the signal during a second detection window.

In an embodiment, a duration of the first detection window is 25 microseconds, and a duration of the second detection window is greater than the duration of the first detection window.

In an embodiment, the duration of the second detection window is less than a duration of a Distributed Coordination Function (DCF) InterFrame Space (DIFS).

In an embodiment, the duration of the second detection window is in the range of 25 to 30 microseconds.

In an embodiment, the first symbol duration is 3.2 microseconds excluding a first Cyclic Prefix (CP), and the second symbol duration is 12.8 microseconds excluding a second CP.

In an embodiment, the method further comprises determining whether the wireless channel is idle or busy during the first detection window using the results of detecting the one or more first symbols. When the wireless channel is determined to be busy during the first detection window, the transmitting device is prevented from transmitting using the wireless channel. When the wireless channel is determined to be idle during the first detection window, the method 1) determines whether the wireless channel is idle or busy during the second detection window using the results of detecting the one or more second symbols, 2) permits the transmitting device to transmit either a High Efficiency (HE) frame or a Very High Throughput (VHT) frame when the wireless channel is determined to be idle during the second detection window, and 3) permits the transmitting device to transmit the VHT frame and prevents the transmitting device from transmitting the HE frame when the wireless channel is determined to be busy during the second detection window.

In an embodiment, permitting the transmitting device to transmit the VHT frame includes permitting the transmitting device to transmit either the VHT frame or a High Throughput (HT) frame.

In an embodiment, the method further comprises determining whether the transmitting device is associated with a High Efficiency (HE) Access Point (AP). When the transmitting device is associated with the HE AP, the method 1) determines whether the wireless channel is idle or busy during the second detection window using the results of detecting the one or more second symbols, 2) permits the transmitting device to transmit either a High Efficiency (HE) frame or a Very High Throughput (VHT) frame when the wireless channel is determined to be idle during the second detection window, and 3) prevents the transmitting device from transmitting using the wireless channel when the wireless channel is determined to be busy during the second detection window. When the transmitting device is not associated with the HE AP, the method 1) determines whether the wireless channel is idle or busy during the first detection window using the results of detecting the one or more first symbols, 2) permits the transmitting device to transmit the VHT frame and prevents the transmitting device from transmitting the HE frame when the wireless channel is determined to be idle during the first detection window, and 3) prevents the transmitting device from transmitting using the wireless channel when the wireless channel is determined to be busy during the first detection window.

In an embodiment, the method further comprises determining whether the wireless channel is idle or busy during the first detection window according to a first threshold, and determining whether the wireless channel is idle or busy during the second detection window according to a second threshold, the second threshold being different from the first threshold.

In an embodiment, a method implemented by a transmitting device for performing mid-packet detection in a wireless channel comprises receiving, by the transmitting device, a signal from the wireless channel, performing a mid-packet detection (MPD) of symbols in the signal, producing a first comparison result by comparing an output of the MDP to a first threshold, producing a second comparison result by comparing the output of the MPD to a second threshold, and determining whether to transmit a frame using the first comparison result and the second comparison result.

In an embodiment, the method further comprises 1) preventing the transmitting device from transmitting in the channel when the second comparison result indicates that the output of the MPD is greater than the second threshold, and 2) permitting the transmitting device to transmit a High Efficiency (HE) frame and preventing the transmitting device from transmitting a High Throughput (HT) frame or a Very High Throughput (VHT) frame when the second comparison result indicates that the output of the mid-packet detection is less than the second threshold and the first comparison result indicates that the output of the MPD is greater than the first threshold.

In an embodiment, the method further comprises permitting the transmitting device to transmit the HT frame, the VHT frame, or the HE frame when the second comparison result indicates that the output of the mid-packet detection is less than the second threshold and the first comparison result indicates that the output of the MPD is less than the first threshold.

In an embodiment, a method implemented by a transmitting device for performing mid-packet detection in a wireless channel comprises performing, by the transmitting device, a determination. The determination produces a first value or a second value. The method further comprises receiving, by the transmitting device, a signal from the wireless channel, and performing a mid-packet detection (MPD) of symbols in the signal. When the determination produces the first value, the method performs a Clear Channel Assessment (CCA) using a result of a comparison of an output of the MPD to a first threshold and using a result of a comparison of the output of the MPD to a second threshold. When the determination produces the second value, the method performs the CCA using the result of the comparison of the output of the MPD to the first threshold and without using the result of the comparison of the output of the MPD to the second threshold.

In an embodiment, the first threshold is an IEEE Std 802.11ac threshold, and the second threshold is a High Efficiency (HE) threshold.

In an embodiment, the method further comprises performing the determination according to a frame to be transmitted by the transmitting device. The determination produces the first value when the frame to be transmitted is a High Efficiency (HE) frame. The determination produces the second value when the frame to be transmitted is not the HE frame.

In an embodiment, the method further comprises performing the determination according to an association of the transmitting device. The determination produces the first value when the association has a High Efficiency (HE) feature enabled. The determination produces the second value when the association does not have the HE feature enabled.

In an embodiment, the method further comprises performing the determination according to whether a High Efficiency (HE) frame was received by the transmitting device within a predetermined period of time. The determination produces the first value when the HE frame was received within the predetermined period of time. The determination produces the second value when the HE frame was not received within the predetermined period of time.

In an embodiment, the second threshold corresponds to a level that is 4 decibels (dB) higher than a level corresponding to the first threshold.

In an embodiment, the second threshold corresponds to a level that is 1.7 decibels (dB) higher than a level corresponding to the first threshold.

In an embodiment, performing the MPD comprises detecting symbols having a first duration in the signal during a first detection window, and detecting symbols having a second duration in the signal during a second detection window when the determination produces the first value. The first symbol duration is different from the second symbol duration, and a duration of the first detection window is different from a duration of the second detection window.

DETAILED DESCRIPTION

Figure 1:
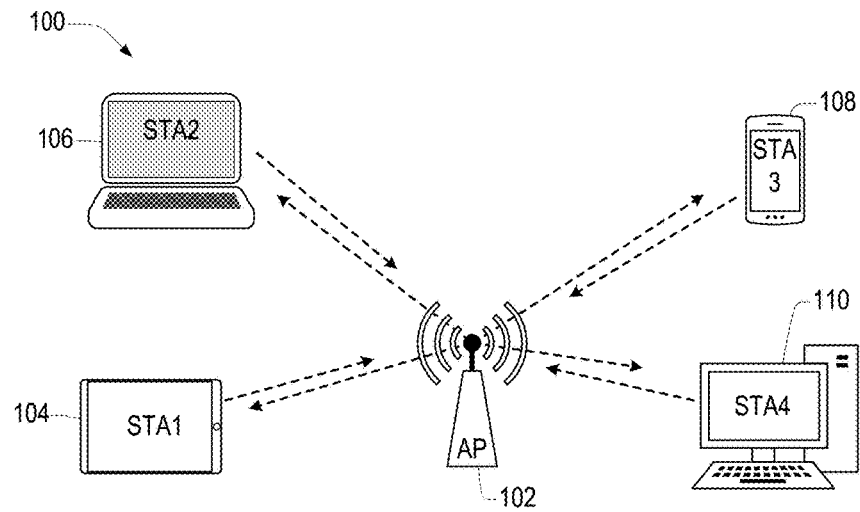
FIG. 1 illustrates a wireless network according to an embodiment.

Embodiments of the present disclosure relate generally to wireless networking, and more particularly, to reliably performing mid-packet detection (MPD) of frames with symbol durations longer than 3.2 µs, such as frames with symbols durations, excluding a cyclic prefix duration, of 12.8 µs.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN, the BSS provides the basic building-block and typically includes an Access Point (AP) and one or more associated stations (STAs). In FIG. 1, the BSS 100 includes an Access Point 102 (also referred to as the AP) wirelessly communicating with first, second, third, and fourth wireless devices (or stations) 104, 106, 108, and 110 (also referred to as STA1, STA2, STA3, and STA4, respectively). The wireless devices may each include a medium access control layer (MAC) and a physical layer (PHY) according to an IEEE 802.11 standard.

Although the example of FIG. 1 shows only the BSS 100 including only the first to fourth stations STA1 to STA4, embodiments are not limited thereto and may comprise BSSs including any number of STAs.

The AP 102 is a station, that is, a STA, configured to control and coordinate functions of the BSS 100. The AP 102 may transmit information to a single station selected from the plurality of stations STA1 to STA4 in the BSS 100 using a single frame, or may simultaneously transmit information to two or more of the stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame. When the BSS 100 supports MU-MIMO, two or more of the stations STA1 to STA4 may simultaneously transmit data to the AP 102 using an UL MU-MIMO frame.

In another embodiment, the AP 102 may be absent and the stations STA1 to STA4 may be in an ad-hoc network.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network.

The transceiver may include a single component that performs the functions of transmitting and receiving, or two separate components each performing one of such functions. The processor and the transceiver may be implemented in each of the stations STA1 to STA4 and the AP 102 using respective hardware components, software components, or both.

The AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may be able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

Each frame's type and subtype may be identified using a type field and a subtype field included in a control field of the frame, as prescribed in the applicable standard.

Figure 2:
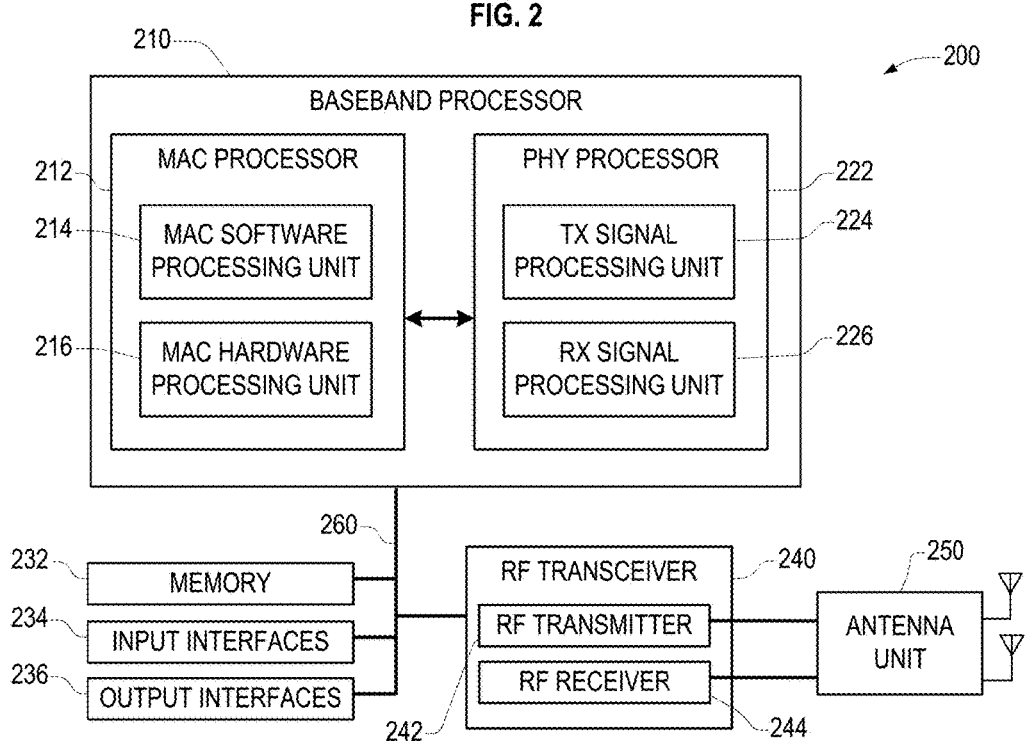
FIG. 2 is a schematic diagram of a wireless device according to an embodiment.

FIG. 2 illustrates a schematic block diagram of a wireless device 200 according to an embodiment. The wireless or WLAN device 200 can represent any device in a BSS, e.g., the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware, hereinafter referred to as "MAC hardware." However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit 224 and a receiving signal processing unit 226. The PHY processor 222 implements a plurality of functions of the PHY layer. These functions may be performed in software, hardware, or a combination thereof according to implementation.

Functions performed by the transmitting signal processing unit 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
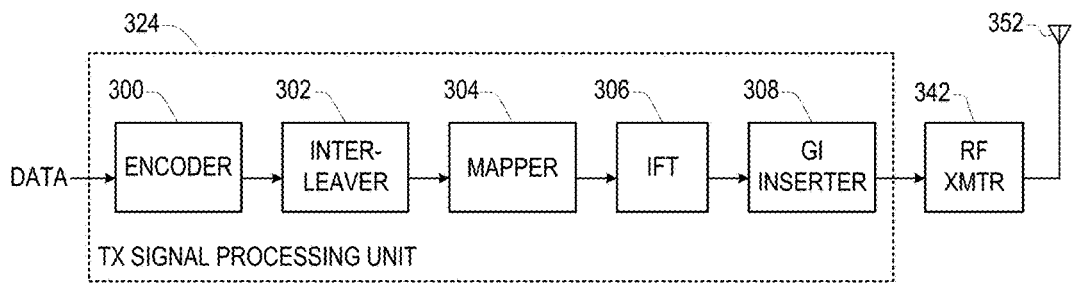
FIG. 3A illustrates components of a wireless device configured to transmit data according to an embodiment.

FIG. 3A illustrates components of a wireless device configured to transmit data according to an embodiment, including a Transmitting (Tx) Signal Processing Unit (TxSP) 324, an RF transmitter 342, and an antenna 352. In an embodiment, the TxSP 324, the RF transmitter 342, and the antenna 352 correspond to the transmitting signal processing unit 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number NSS of spatial streams of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number NSTS of space-time streams and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IIFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
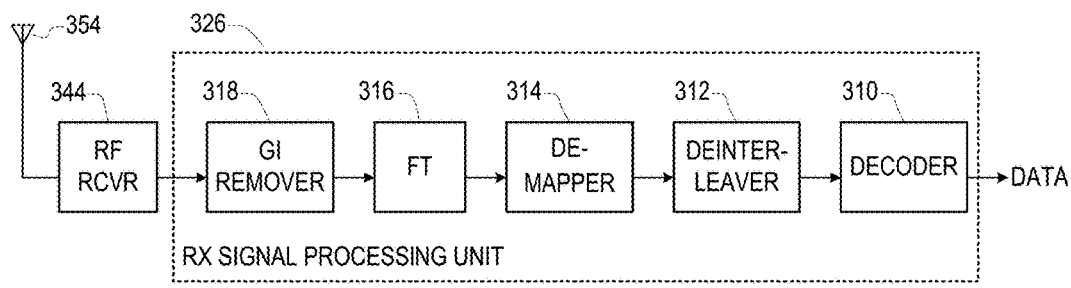
FIG. 3B illustrates components of a wireless device configured to receive data according to an embodiment.

FIG. 3B illustrates components of a wireless device configured to receive data according to an embodiment, including a Receiver (Rx) Signal Processing Unit (RxSP) 326, an RF receiver 344, and an antenna 354. In an embodiment, the RxSP 326, RF receiver 344, and antenna 354 may correspond to the receiving signal processing unit 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

Figure 4:
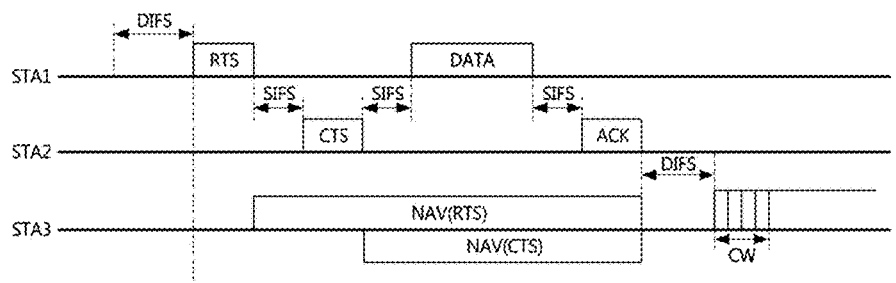
FIG. 4 illustrates a Carrier Sense Multiple Access/Collision Avoidance (CSMA/CA) based frame transmission procedure according to an embodiment.

FIG. 4 illustrates a Carrier Sense Multiple Access/Collision Avoidance (CSMA/CA) based frame transmission procedure for avoiding collision between frames in a channel according to an embodiment. FIG. 4 shows a first station STA1 for transmitting data, a second station STA2 for receiving the data, and a third stations STA3 that may be located in an area where a frame transmitted from the STA1 and/or a frame transmitted from the STA2 can be received. The first, second, and third stations STA1, STA2, And STA3 may be Wireless LAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a Distributed Coordination Function (DCF) InterFrame Space (DIFS) (and performing backoff if required), the STA1 may transmit a Ready-To-Send (RTS) frame to the STA2. Upon receiving the RTS frame, the STA2 may, after a Short Inter-Frame Space (SIFS), transmit a Clear-To-Send (CTS) frame as a response of the CTS frame.

When the STA3 receives the RTS frame, it may set a NAV timer of the STA3 for a transmission duration of subsequently transmitted frames (for example, a duration of SIFS+CTS frame duration+SIFS+data frame duration+SIFS+ACK frame duration) using duration information included in the RTS frame. When the STA3 receives the CTS frame, it may set the NAV timer of the STA3 for a transmission duration of subsequently transmitted frames (for example, a duration of SIFS+data frame duration+SIFS+ACK frame duration) using duration information included in the CTS frame. Upon receiving a new frame before the NAV timer expires, the STA3 may update the NAV timer of the STA3 by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, the STA3 may determine whether the channel is busy using the carrier sensing. Upon determining that the channel is not used by the other devices during DIFS after the NAV timer has expired, the STA3 may attempt to access the channel after a contention window according to random backoff elapses.

In the 802.11a and g standards, the supported bandwidth is 20 MHz, and the standards require that, for CCA, a device must detect, within 4 µs, the start of a valid OFDM frame (that is, signal detect CCA) at or above −82 dBm with greater than 90% probability and then hold CCA busy for the duration of the detected frame. For energy detect CCA, the 802.11a and g standards require a device to determine, within 4 us, that the medium is busy when any signal is detected at or above −62 dBm.

In the 802.11n High Throughput (HT) channels, additional CCA requirements are introduced, including support for −62 dBm energy detection in a secondary 20 MHz channel. No signal detection CCA is required for a secondary channel. 802.11n also specifies signal detection in a GreenField (GF) mode for detecting a signal at or above −72 dBm in a 20 MHz channel, and detecting a signal at or above −69 dBm in a 40 MHz channel.

Very High Throughput (VHT) elements of IEEE 802.11ac support greater bandwidths. Therefore, signal detection levels for IEEE 802.11ac VHT energy detection CCA are −82, −79, −76 and −73 dBm for 20, 40, 80, and 160 MHz channels, respectively.

The IEEE 802.11ac standard also specifies additional mid-packet detection CCA for the secondary channels. Because mid-packet detection may rely on the structure of the symbols that make up an OFDM frame, the sensitivity for mid-packet detection may be higher than the sensitivities for energy detection. That is, mid-packet detection may be able to detect signals in a secondary channel that are weaker than can be detected using energy detection.

For example, an embodiment of mid-packet detection may use autocorrelation (that is, correlating a signal with a delayed copy of the signal) to detect the Cyclic Prefix (CP) of an Orthogonal Frequency Division Multiplexing (OFDM) symbol. A CP is created by copying a predetermined portion of an OFDM symbol and prefixing it to the beginning of the symbol. In embodiments, the predetermined portion (and therefore the duration of the CP) may be a predetermined time such as 0.8 µs, 1.6 µs, or 3.2 µs.

Figure 5:
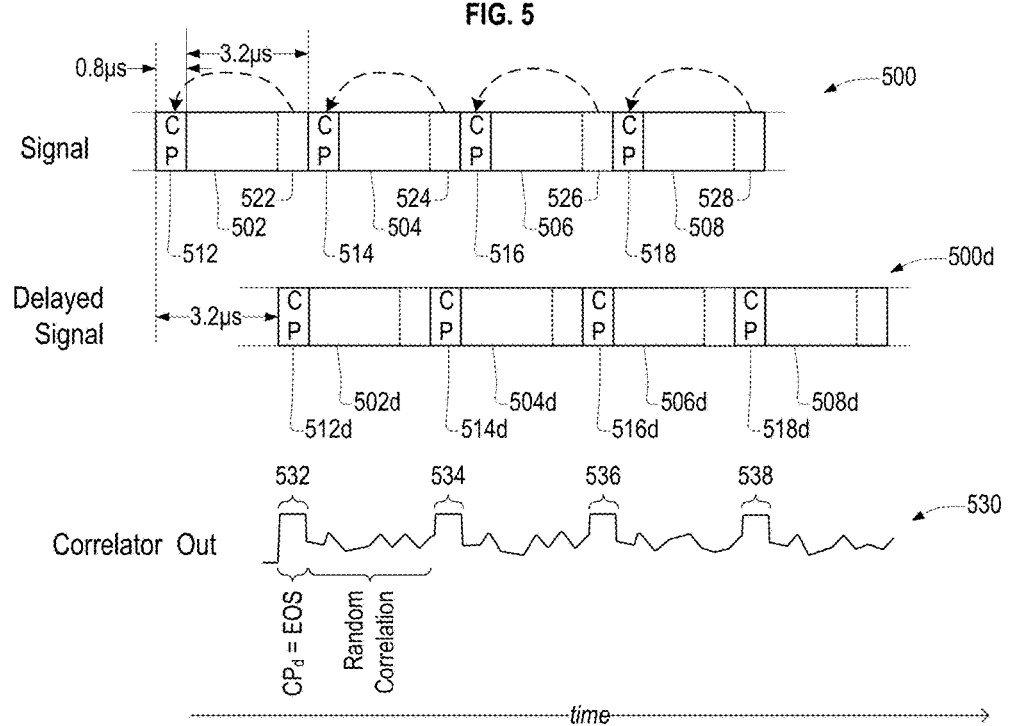
FIG. 5 illustrates autocorrelation of a signal having a symbol duration of 3.2 µs according to an embodiment.

FIG. 5 illustrates autocorrelation of a signal 500 having a symbol duration (as used herein, exclusive of the duration of the CP) of 3.2 µs and a CP duration of 0.8 µs. The signal 500 includes first, second, third, and fourth symbols 502, 504, 506, and 508. The first, second, third, and fourth symbols 502, 504, 506, and 508 have respective first, second, third, and fourth Cyclic Prefixes (CPs) 512, 514, 516, and 518. The first, second, third, and fourth CPs 512, 514, 516, and 518 respectively are copies of first, second, third, and fourth final portions 522, 524, 526, and 528 of the corresponding first, second, third, and fourth symbols 502, 504, 506, and 508.

A delayed signal 500d may be produced by delaying the signal 500 by the symbol duration, that is, by 3.2 µs. The delayed signal 500d includes first, second, third, and fourth delayed symbols 502d, 504d, 506d, and 508d and corresponding first, second, third, and fourth delayed CPs 512d, 514d, 516d, and 518d.

Because the first, second, third, and fourth delayed CPs 512d, 514d, 516d, and 518d are delayed by the symbol duration of 3.2 µs, the first, second, third, and fourth delayed CPs 512d, 514d, 516d, and 518d are aligned in the correlator with the first, second, third, and fourth final portions 522, 524, 526, and 528, respectively, which they are copies of. As a result, first, second, third, and fourth match indications 532, 534, 536, and 538 indicating matches between the delayed CPs 512d, 514d, 516d, and 518d and the first, second, third, and fourth final portions 522, 524, 526, and 528, respectively, are present in a correlator output signal 530 produced by correlating the signal 500 with the delayed signal 500d.

A device performing mid-packet detection may interpret the match indications 532, 534, 536, and 538 in the correlator output signal 530 as respectively indicating the presence of first to fourth OFDM symbols each having a 3.2 µs duration (excluding CP) in the signal 500.

Figure 6:
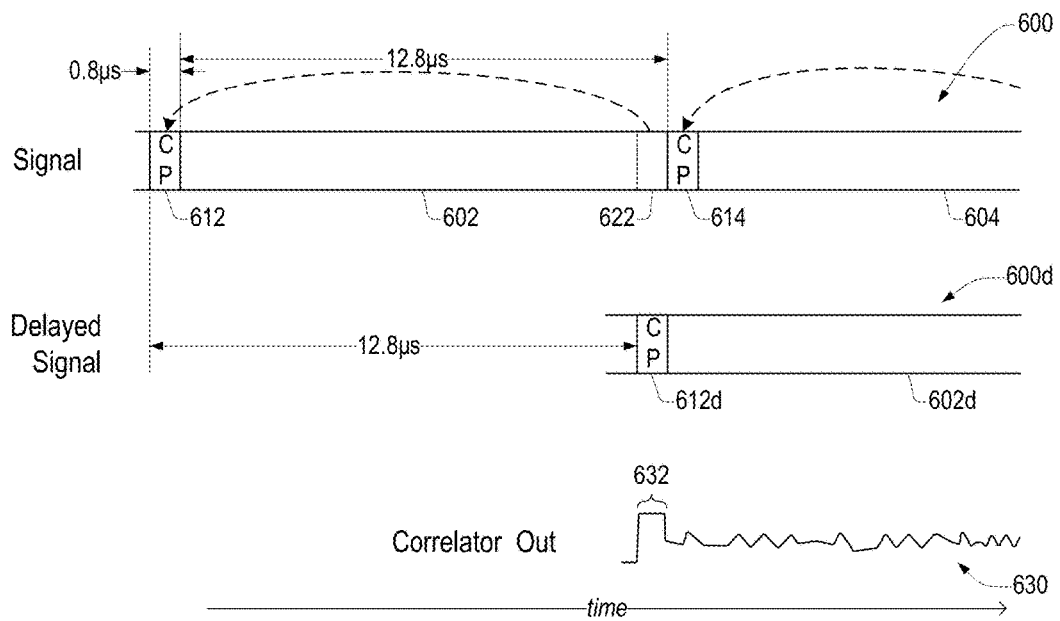
FIG. 6 illustrates autocorrelation of a signal having a symbol duration of 12.8 µs according to an embodiment.

FIG. 6 illustrates autocorrelation of a signal 600 having a symbol duration of 12.8 µs and a CP duration of 0.8 µs. The signal 600 includes first and second symbols 602 and 604. The first and second symbols 602 and 604 have respective first and second CPs 612 and 614. The first and second CPs 612 and 614 respectively are copies of first and second final portions 622 and 624 of the corresponding first and second symbols 602 and 604.

A delayed signal 600d may be produced by delaying the signal 600 by the symbol duration, that is, by 12.8 µs. The delayed signal 600d includes first delayed symbol 602d and corresponding first delayed CP 612d. The second delayed symbol and second delayed CP are not shown.

Because the first delayed CP 612d is delayed by the symbol duration of 12.8 µs, the first delayed CP 612d is aligned with the first final portions 622 which it is a copy of. As a result, a match indication 632 indicating a match between the delayed CP 612d and the first final portion 622 is present in a correlator output signal 630 produced by correlating the signal 600 with the delayed signal 600d.

A device performing mid-packet detection may interpret the match indications 632, in the correlator output signal 630 as indicating the presence of an OFDM symbols having a 12.8 µs duration in the signal 600.

If OFDM symbols are detected at or above a certain threshold within a Point Coordination Function (PCF) Inter-Frame Space (PIFS) (defined as 25 µs for 5 GHz transmissions in IEEE Std 802.11 and all transmissions according to IEEE 802.11ac), then the secondary channel is indicated as busy. The specific requirements of the IEEE 802.11ac specification for secondary channel CCA are shown in Table 1.

TABLE 1

IEEE 802.11 ac Secondary Channel CCA Requirements

| BW | Signal (>90% within 4 μs) | Energy Detection (within 4 μs) | Mid-Packet Detection (>90% within 25 μs) |
|---|---|---|---|
| 20 MHz | N/A | −62 dBm | −72 dBm |
| 40 MHz | N/A | −59 dBm | −72 dBm |
| 80 MHz | N/A | −56 dBm | −72 dBm/−69 dBm |

As shown in Table 1, the IEEE 802.11ac standard requires a device to detect, within 4 μs, any energy over −62 dBm in a secondary channel having a 20 MHz bandwidth (BW), and to detect, within 25 μs and with greater than 90% reliability, an OFDMA frame in the secondary channel having a 20 MHz bandwidth (BW) when the OFDM frame has a power level of over −72 dBm. When a secondary channel has an 80 MHz bandwidth, the IEEE 802.11ac standard requires the device detect, within 25 μs and with greater than 90% reliability, an OFDM frame having either a i) 20 MHz or 40 MHz BW and a power level of over −72 dBm, or ii) an 80 MHz BW and a power level of over −69 dBm.

However, if the PIFS is 25 μs and an OFDM symbol length increases due to the use of a 256-point finite Fourier Transform in generating the OFDM symbol (causing an increase of the symbol duration excluding CP to 12.8 μs), the mid-packet CCA as prescribed in IEEE 802.11ac may not be possible with a high reliability.

Figure 7:
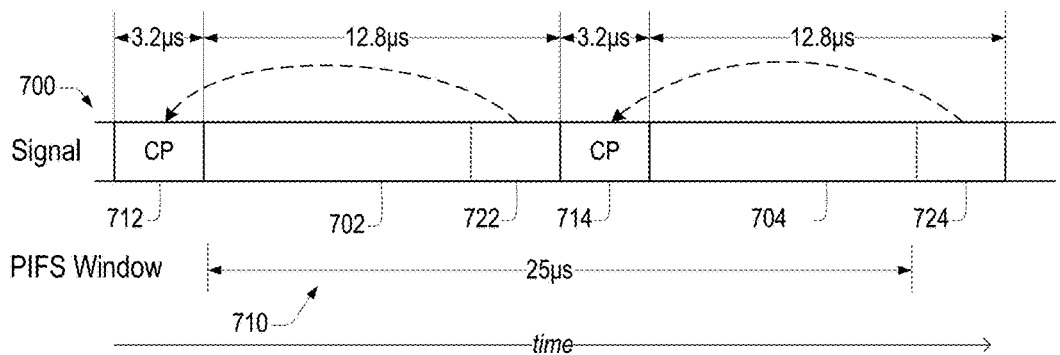
FIG. 7 illustrates an alignment between symbols in a signal and a PIFS window according to an embodiment.

FIG. 7 illustrates an alignment between symbols in a signal 700 and a PIFS window 710 according to an embodiment. The PIFS window 710 has a duration of 25 μs.

The signal 700 includes first and second symbols 702 and 704, each having a symbol duration of 12.8 μs excluding CP. The signal 700 also includes first and second CPs 712 and 714 respectively preceding the first and second symbols 702 and 704. The first and second CPs 712 and 714 each have a duration of 3.2 μs. The total duration of each symbol and the respective preceding CP is 16 μs.

The first and second CPs 712 and 714 are copies of first and second final portions 722 and 724 of the first and second symbols 702 and 704. The first and second final portions 722 and 724 have durations equal to the duration of the first and second CPs 712 and 714, respectively.

When the PIFS window 710 occurs at the time shown in FIG. 7, a correlator performing autocorrelation on the signal 700 during the PIFS window 710 will not find any matches. This is because while the first final portion 722 is within the PIFS window 710, the first CP 712 that is a copy of the first final portion 722 is not within the PIFS window 710, and while the second CP 714 is within the PIFS window 710, the second final portion 724 that the second CP 714 is a copy of is not within the PIFS window 710. As a result, a device relying on autocorrelation for mid-packet detection will not detect either of the symbols 702 and 704 that (at least partially) occur in the PIFS window 710.

In an embodiment, a station may from time to time use a longer window for mid-packet detection to improve the reliability of detecting frames having symbol durations longer than 3.2 μs, such as, for example, frames having a 12.8 μs symbol duration. Different detection window durations may correspond to different stations behaviors.

When performing communication in a 2.4 GHz frequency band, a station operating according to IEEE Std 802.11 (that is, an HT station) does not use a PIFS for the secondary 20 MHz channel access. The HT station relies on energy detection CCA and the need for the channel to be idle for a DIFS, which is defined as SIFS+2×aSlotTime and is therefore always one slot time longer than a PIFS (which is defined as a SIFS+aSlotTime). Because an SIFS for 2.4 GHz is 10 μs, and aSlotTime for 2.4 GHz is 9 μs, a PIFS for 2.4 GHz is 10+9=19 μs.

When communicating in a 2.4 GHz band, a wireless device uses signal extension to virtually extend the TX Time of a packet, not to the change the behavior of the Inter-Frame Space (IFS). As a result, a device performing communications according to IEEE 802.11ax (that is, High Efficiency (HE) communications) in a 2.4 GHz band may either perform mid-packet detection using a different detection window duration or may rely on DIFS. The detection window duration is determined in IEEE 802.11ac by the parameter aCCAMidTime, which is defined as "the maximum time (in μs) the CCA mechanism has available to assess the medium to determine whether an IEEE 802.11 transmission is present on a non-primary channel."

When communicating in a 5 GHz band, a station operating according to IEEE 802.11ac (that is, a Very High Throughput (VHT) station) operates as a VHT station even when associated with a legacy AP (for example, an AP operating according to IEEE Std 802.11n), and therefore the mid-packet CCA rules of IEEE 802.11ac still apply. Accordingly, a station operation according to 802.11ax (that is, an HE station) may apply the HE CCA rules when the HE station is associated with legacy AP (e.g., an IEEE 802.11n or 802.11ac AP). A single behavior will dictate CCA detection policy for an HE station, regardless of whether the HE station is communicating using HT or VHT packets.

Worst-case mid-packet detection scenarios for IEEE 802.11ac (that is, for transmissions using a symbol duration of 3.2 μs, exclusive of a CP duration) may be used to determine a longer aCCAMidTime for HE stations. That is, a mid-packet detection window location is determined, at which the number of auto-correlation samples are the least.

Accordingly, for a symbol duration of 3.2 μs, when the CP duration is 0.4 μs, a minimum of 6 auto-correlation matches will occur in a 25 μs window, corresponding to a total of 6×0.4=2.4 μs worth of autocorrelated samples. When the CP duration is 0.8 μs, a minimum of 5 auto-correlation matches will occur in 25 μs, corresponding to a total of 5×0.8=4.0 μs worth of autocorrelated samples.

Figure 8A:
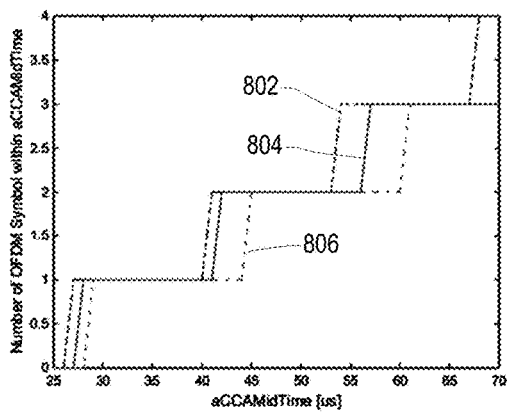
FIG. 8A illustrates a number of 12.8 µs OFDM symbols that may be completely (including the associated CP) within a given aCCAMidTime, according to an embodiment.

FIG. 8A illustrates a number of OFDM symbols having a symbol duration (exclusive of a CP duration) of 12.8 μs that may be completely (including the associated CP) within a given aCCAMidTime, that is, within a given detection window. A first line 802 indicates the number that may occur when the CP duration is 0.8 μs. A second line 804 indicates the number that may occur when the CP duration is 1.6 μs. A third line 806 indicates the number that may occur when the CP duration is 3.2 μs.

FIG. 8A shows that, for example, one complete 12.8 μs OFDM symbol, including its associated CP, is guaranteed to occur within the detection window when the aCCAMidTime is 29 μs, regardless of the duration of the CP. As a result, when the aCCAMidTime is 29 μs, one match having a duration equal to the CP duration may be detected when a signal containing the 12.8 μs OFDM symbol is autocorrelated with a version of the signal that has been delayed by 12.8 μs.

Figure 8B:
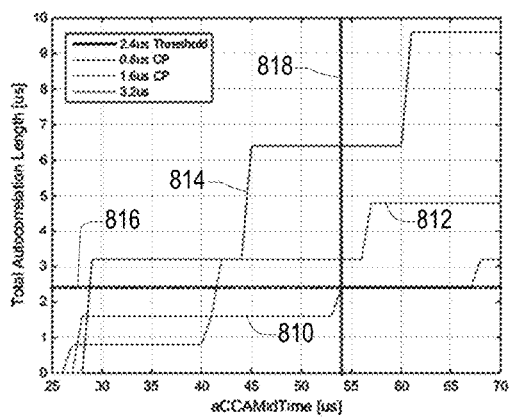
FIG. 8B illustrates a required aCCAMidTime to achieve a given length of valid auto-correlation matches for 12.8 µs OFDM symbols according to an embodiment.

FIG. 8B illustrates a required aCCAMidTime to achieve a given length of valid auto-correlation matches for OFDM symbols having a symbol duration (exclusive of a CP duration) of 12.8 μs for CP durations of 0.8, 1.6, and 3.2 seconds. A first line 810 corresponds to the CP duration of 0.8 μs. A second line 812 corresponds to the CP duration of 1.6 μs. A third line 814 corresponds to the CP duration of 3.2 μs.

A horizontal line 816 marks the level at which 2.4 μs of total autocorrelation matches occurs (thus equaling the number amount of total autocorrelation matches that occur for 3.2 μs symbols with 0.4 μs CPs in a 25 μs window). A vertical line 818 indicates the aCCAMidTime required to produce 2.4 μs of total autocorrelation matches for the worst case (54 μs) when the CP duration is 0.8 μs, as shown by the first line 810.

Because the worst case estimate of the required aCCAMidTime to produce 2.4 μs of matches is 54 μs, the actual require time might be less, and may be between 29 μs and 54 μs.

Requiring a value of 54 μs for aCCAMidTime may introduce unwanted behaviors in the WLAN. Because DIFS=(aSignalExtension)+SIFS+2×aSlotTime=6 μs+10 μs+2×9 μs=34 μs, and 54 μs corresponds to DIFS+2.2×aSlotTime, the whole CCA and transmission procedure defined in the IEEE 802.11 and 802.11ac standards can malfunction when a 54 μs aCCAMidTime is used, and as a result more contention for the channel may occur.

To avoid contention fairness issues, and in particular to prevent legacy (e.g., IEEE 802.11n and 802.11ac) devices from having a pronounced advantage when competing for access to the channel, the aCCAMidTime may need to be smaller than (DIFS−4 μs), which is 30 μs, where DIFS is 34 μs and the 4 μs is the measurement time for the energy detect CCA. If the aCCAMidTime is exactly DIFS, a station may need to contend for the channel with other stations in the secondary channel. Therefore, aCCAMidTime may be made smaller than DIFS to avoid contention.

In an embodiment, an HE station may have two values for aCCAMidTime: a first aCCAMidTime value for detecting legacy frames (that is, non-HT, HT, and VHT frames transmitted according to the IEEE Std 802.11 and IEEE 802.11ac) and a second aCCAMidTime for detection of HE frames transmitted according to the IEEE 802.11ax.

The second aCCAMidTime may be longer than the first aCCAMidTime. In an embodiment, when the second aCCAMidTime is set to 0, there is no mid-packet detection of HE frames.

Figure 9:
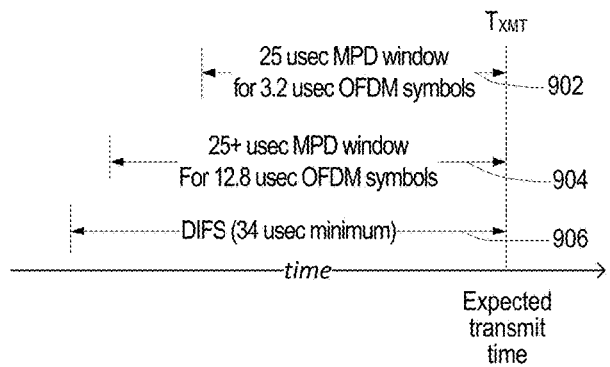
FIG. 9 illustrates a first detection window and a second detection window according to an embodiment.

FIG. 9 illustrates a first detection window 902 having a duration equal to a first aCCAMidTime and a second detection window 904 having a duration equal to a second aCCAMidTime. Also shown is a DCF InterFrame Space (DIFS) 906 having a duration of at least 34 μs. The durations of the first detection window 902, second detection window 904, and DIFS 906 are measured relative to an expected transmission time $T_{XMT}$, the expected transmission time $T_{XMT}$ being a time determined by the station to be a first opportunity to transmit a frame if the channel is available.

In an embodiment, the first aCCAMidTime is 25 μs, and the second aCCAMidTime is greater than 25 μs. The second aCCAMidTime may be less than the duration of the DIFS 906. In another embodiment, the second aCCAMidTime may be less than 30 μs, the duration of (DIFS−4 μs), in order to avoid contention.

Figure 10:
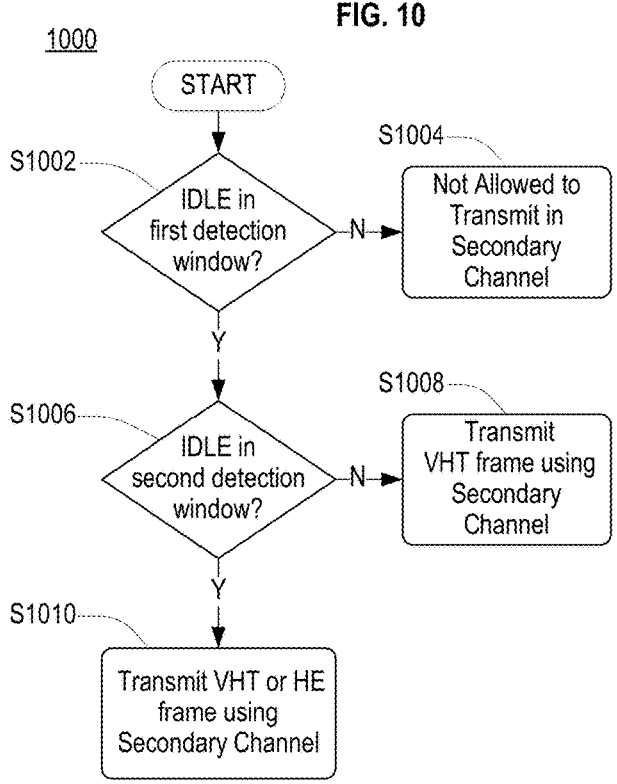
FIG. 10 illustrates a process that determines a behavior of a High Efficiency (HE) station having first and second aCCAMidTime values according to an embodiment.

FIG. 10 illustrates a process 1000 that determines a behavior of an HE station having first and second aCCAMidTime values according to an embodiment. The first aCCAMidTime value determines a duration of a first detection window, the first detection window being for mid-packet detection of symbols with a first symbol duration of 3.2 μs in a secondary channel. The second aCCAMidTime value determines a duration of a second detection window, the second detection window being for mid-packet detection of symbols with a second symbol duration of 12.8 μs in the secondary channel.

In an embodiment, the second aCCAMidTime value is greater than the first aCCAMidTime value.

The HE station may determines whether the secondary channel is BUSY or IDLE during the first detection window, and independently determine whether the secondary channel is BUSY or IDLE during the second detection window. The secondary channel may be determined as BUSY when a predetermined number or more of matching samples are detected in the secondary channel, and may be determined to be IDLE otherwise. The predetermined number of matching samples may be different between the first and second detection windows.

In an illustrative embodiment, the HE station may i) perform CCA using a first autocorrelation performed on a signal in the secondary channel during the first detection window, the first autocorrelation to compare samples separated by the first symbol duration, to determine whether the secondary channel is BUSY or IDLE during the first detection window, and ii) perform CCA using a second autocorrelation performed on the signal during the second detection window, the second autocorrelation to compare samples separated by the second symbol duration, to determine whether the secondary channel is BUSY or IDLE during the second detection window.

At S1002, the process 1000 determine whether the secondary channel has been IDLE throughout the first detection window. When the secondary channel has been IDLE throughout the first detection window, the process 1000 proceeds to S1006. Otherwise, at S1002 the process 1000 proceeds to S1004.

At S1004, the HE station may be barred from transmitting a frame using the secondary channel.

At S1006, the process 1000 determine whether the secondary channel has been IDLE throughout the second detection window. When the secondary channel has been IDLE throughout the second detection window, the process 1000 proceeds to S1010. Otherwise, at S1006 the process 1000 proceeds to S1008.

At S1008, the HE station may transmit a VHT frame using the secondary channel. The HE station may be barred from transmitting an HE frame. In another embodiment, at S1008, the HE station may transmit a VHT frame or a HT frame in accordance with 802.11n.

At S1010, the HE station may transmit, using the secondary channel, a VHT frame in accordance with 802.11ac or an HE frame in accordance with 802.11ax. In another embodiment, at S1010, the HE station may transmit, using the secondary channel, a VHT frame, an HE frame or HT frame in accordance with 802.11n.

Figure 11:
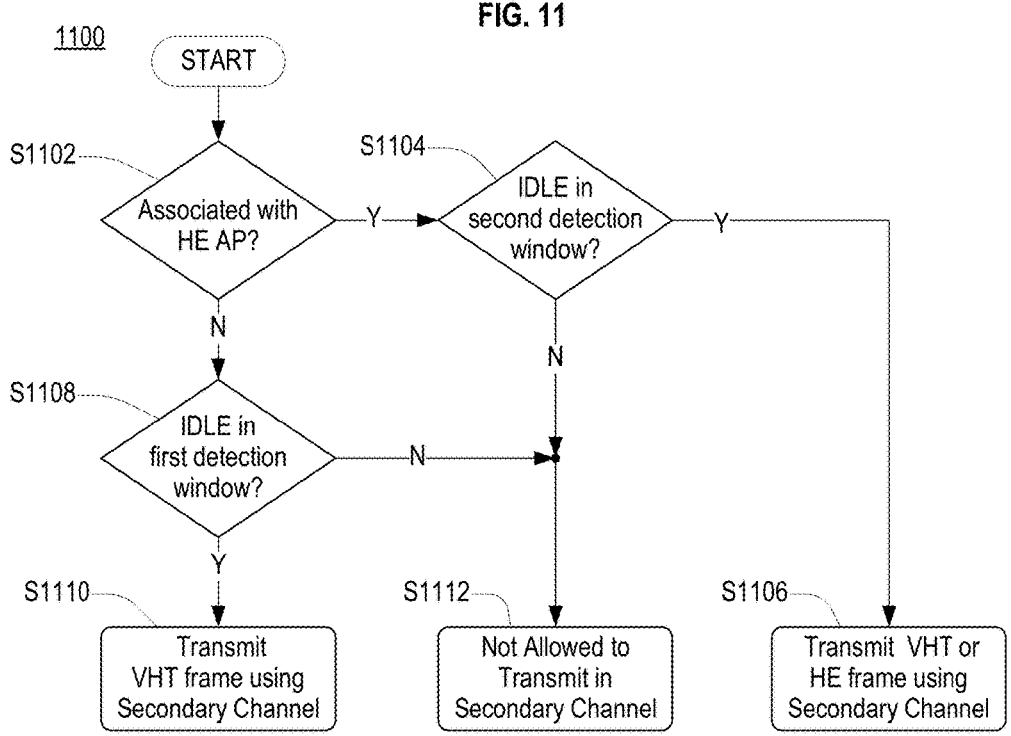
FIG. 11 illustrates another process that determines a behavior of an HE station having first and second aCCAMidTime values according to an embodiment.

FIG. 11 illustrates a process 1100 that determines a behavior of an HE station having first and second aCCAMidTime values according to another embodiment. The first aCCAMidTime value determines a duration of a first detection window, the first detection window being for mid-packet detection of symbols with a first symbol duration of 3.2 μs in a secondary channel. The second aCCAMidTime value determines a duration of a second detection window, the second detection window being for mid-packet detection of symbols with a second symbol duration of 12.8 μs in the secondary channel.

At S1102, the process 1100 determines whether the HE station is associated with an HE Access Point (AP) operating according to 802.11ax. When the HE station is associated with the HE AP, the process 1100 proceeds to S1104. Otherwise, at S1102 the process 1100 proceeds to S1108.

At S1104, the process 1100 determines whether the secondary channel has been IDLE throughout the second detection window. When the secondary channel has been IDLE throughout the second detection window, the process 1100 proceeds to S1106. Otherwise, at S1104 the process 1100 proceeds to S1112.

At S1106, the HE station may transmit, using the secondary channel, a VHT frame in accordance with 802.11ac or an HE frame in accordance with 802.11ax. In another embodiment, at S1106, the HE station may transmit, using the secondary channel, a VHT frame, an HE frame or HT frame in accordance with 802.11n.

At S1108, the process 1100 determines whether the secondary channel has been IDLE throughout the first detection window. When the secondary channel has been IDLE throughout the first detection window, the process 1100 proceeds to S1110. Otherwise, at S1006 the process 1100 proceeds to S1112.

At S1110, the HE station may transmit a VHT frame using the secondary channel. The HE station may be barred from transmitting an HE frame. In another embodiment, at S1110, the HE station may transmit a VHT frame in accordance with 802.11ac or a HT frame in accordance with 802.11n, and may be barred from transmitting an HE frame.

At S1112, the HE station may be barred from transmitting a frame using the secondary channel.

Figure 12:
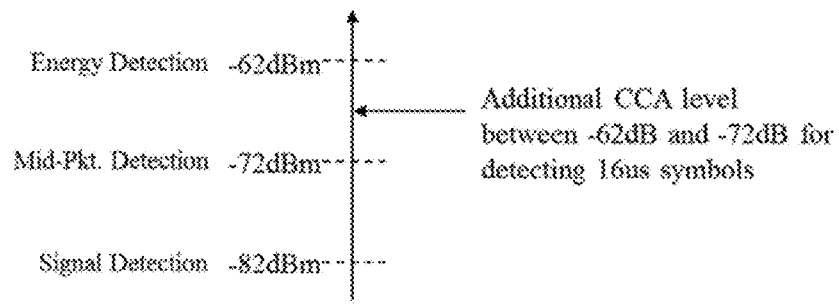
FIG. 12 illustrates Clear Channel Assessment (CCA) thresholds according to an embodiment.

A reduction in a probability of detecting an OFDM symbol caused by an increase in the symbol duration of the symbol may be compensated by using a different CCA threshold. Accordingly, in an embodiment, a CCA threshold for detection of symbols having longer durations than 3.2 μs (such as symbols with symbol durations of 12.8 μs and CP durations of 3.2 μs) may be adjusted, as shown in FIG. 12.

Figure 13:
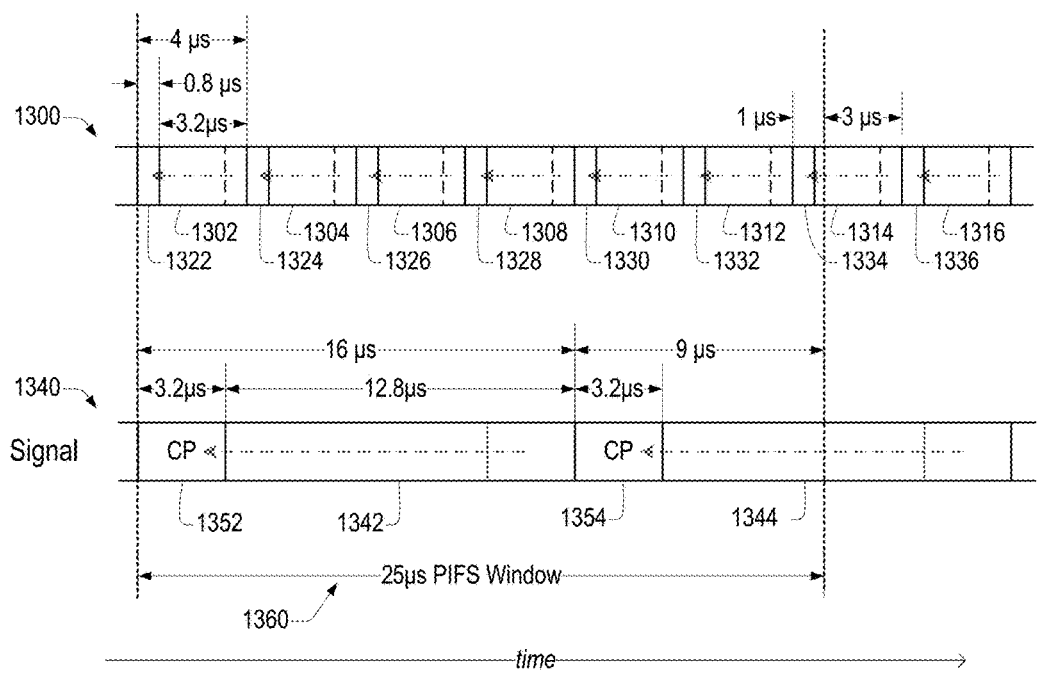
FIG. 13 illustrates an analysis for determining an appropriate adjusted threshold value for mid-packet detection, according to an embodiment.

FIG. 13 illustrates an analysis for determining an appropriate adjusted threshold value for mid-packet detection, with a predetermined reliability, of frames having symbols with a symbol duration of 12.8 μs and a CP duration of 3.2 μs. FIG. 13 shows a VHT signal 1300 according to IEEE 802.11ac, an HE signal 1340 according to IEEE 802.11ax, and a PIFS window 1360. The duration of the PIFS window 1360 is 25 μs.

The VHT signal 1300 including first to eighth VHT symbols 1302 to 1316 respectively. The VHT symbols 1302 to 1316 have respective symbol durations of 3.2 μs. The VHT signal 1300 also includes first to eighth VHT Cyclic Prefixes (CPs) 1322 to 1336 of the VHT symbols 1302 to 1316, respectively. The VHT CPs 1322 to 1336 have respective CP durations of 0.8 μs and are copies of final portions of the respective VHT symbols 1302 to 1316.

The HE signal 1340 includes first and second HE symbols 1342 and 1344 respectively. The HE symbols 1342 and 1344 have respective symbol durations of 12.8 μs. The HE signal 1340 also includes first and second HE Cyclic Prefixes (CPs) 1352 and 1354 of the HE symbols 1342 and 1344, respectively. The HE CPs 1352 and 1354 have respective CP durations of 3.2 μs and are copies of final portions of the respective HE symbols 1342 and 1344.

Because the VHT symbols 1302 to 1316 have total durations, including the associated VHT CPs 1322 to 1336, of 4 μs, respectively, the VHT signal 1300 has a 75% chance of producing 5 autocorrelation matches and a 25% chance of producing 6 autocorrelation matches within the PIFS window 1360. Thus, on the average, 5.25 autocorrelation matches will occur in the PIFS window 1360 for the VHT signal 1300.

Similarly, because the HE symbols 1342 and 1344 have total durations, including the associated HE CPs 1352 and 1354, of 16 μs, respectively, the HE signal 1340 has a 56.25% chance of producing 1 autocorrelation match and a 43.75% chance of producing no autocorrelation matches within the PIFS window 1360. Thus, on average 0.56 autocorrelation matches will occur in the PIFS window 1360 for the HE signal 1340.

However, because the HE CPs 1352 and 1354 have durations (3.2 μs) that are four times longer than the durations (0.8 μs) of the VHT CPs 1322 to 1336, each autocorrelation match for the HE signal 1340 includes four times as many matching samples as each autocorrelation match for the VHT signal 1300.

Accordingly, the HE symbols 1342 and 1344 of 16 μs have 10 times lower autocorrelation chances than the VHT symbols 1302 to 1316 of 4 μs, while having 4 times more samples for each autocorrelation. In order to compensate for this degradation, the ratio of the number of average autocorrelation sample matches between the VHT signal 1300 and the HE signal 1340 (10 times as many matches divided by four times as many samples per match) can be calculated in the decibel (dB) domain, and added into the existing mid-packet CCA threshold level as shown in Equation 1:

$$\text{Additional threshold in dB} = 10\log(10/4) = 3.97 \text{ dB} \approx 4 \text{ dB.} \quad \text{Equation 1}$$

Accordingly, the adjusted CCA level for detecting HE symbols can be −68 dBm, that is, −72 dBm+4 dB. The exact value is for the purpose of an example. The procedure used to determine the adjusted CCA level described above may be applied for other CP durations or other PIFS window durations to produce corresponding adjusted CCA levels for those cases as well.

An adjusted CCA level may also be determined by an analysis of a number of autocorrelation matches per PIFS window that includes a consideration of transition periods, that is, periods during which part but not all of a CP and the corresponding part of the final portion of the associated symbol are both present within the PIFS window.

Figure 14A:
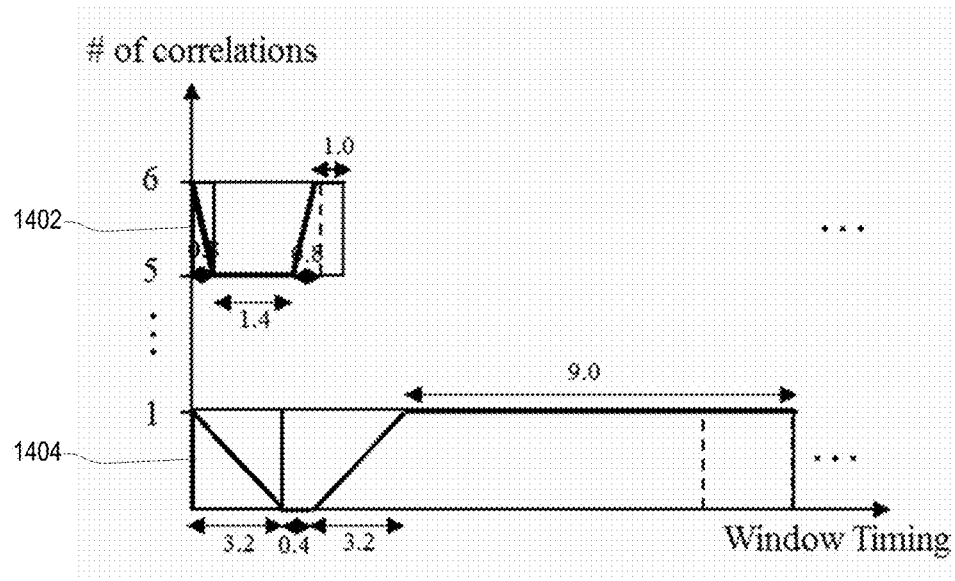
FIG. 14A illustrates outputs of an autocorrelation according to an alignment of a detection window with symbols, according to an embodiment.

For example, as shown in FIG. 14A in transitions between 6 and 5 auto-correlation for a VHT symbol 1402 having a 4 μs total duration and CP durations of 0.8 μs, the correlator outputs are between what the output would be for 5 and 6 complete matches when a match to only a portion of a CP occurs.

These transition periods also exist in the 16 μs HE symbol case as well. For an HE symbol 1404 having a 16 μs total duration including CP durations of 3.2 μs, the correlator outputs are between what the output would be for 0 and 1 complete matches when a match to only a portion of a CP occurs.

Figure 14B:
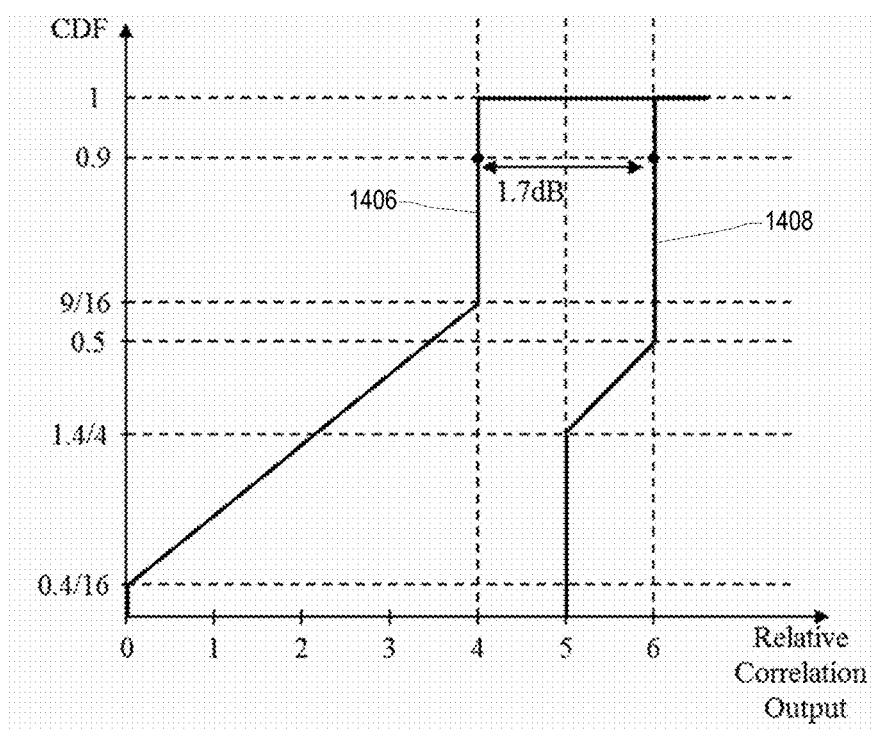
FIG. 14B illustrates a Cumulative Distribution Function (CDF) of outputs of an autocorrelation, according to an embodiment.

As a result, a Cumulative Distribution Function (CDF) can be computed based on the HE symbol of 16 μs having 4 times larger correlator output (per complete CP match) than that of a VHT symbol of 4 μs, as shown in FIG. 14B. Based on the CDF, it can be determined that an adjustment of a CCA level by 1.7 dB (such as from −72 dBm to −70.3 dBm) will provide a probability of 90% detection of the HE symbols. The exact value is for the purpose of an example. The procedure used to determine the adjusted CCA level described above may be applied for other CP durations or other PIFS window durations to produce corresponding adjusted CCA levels for those cases as well.

Figure 15:
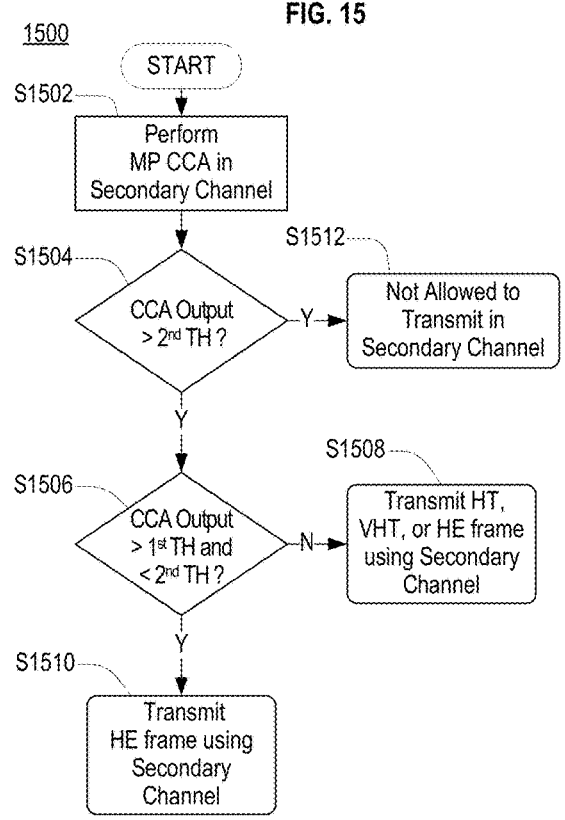
FIG. 15 illustrates a process for controlling a behavior of an HE station having more than one mid-packet CCA threshold, according to an embodiment.

FIG. 15 illustrates a process 1500 for controlling a behavior of an HE station having more than one mid-packet CCA threshold (TH). The HE station may have a first threshold for the detection of VHT symbols, and a second threshold for the detection of HE symbols.

At S1502, the process 1500 performs mid-packet (MP) CCA in a secondary channel. According to the MP CCA, HE station may detect one or more of VHT symbols and HE symbols.

At S1504, the process 1500 determines whether the output of the MP CCA is greater than the second threshold, such as a second threshold corresponding to −68 dBm. When the output of the MP CCA is greater than the second threshold, the process 1500 proceeds to S1512. Otherwise, at S1504 the process 1500 proceeds to S1506.

At S1506, the process 1500 determines whether the output of the MP CCA is greater than the first threshold, such as a first threshold corresponding to −72 dBm, and less than the second threshold. When the output of the MP CCA is greater than the first threshold and less than the second threshold, the process 1500 proceeds to S1510. Otherwise, at S1508 the process 1500 proceeds to S1508.

At S1508, the process 1500 allows the HE stations to transmit an HT, VHT or HE frame using the secondary channel.

At S1510, the process 1500 allows the HE stations to transmit an HE frame using the secondary channel. The HE station may be barred from transmitting an HT or VHT frame at S1510.

At S1512, the HE stations is barred from using the secondary channel to transmit a frame.

Figure 16:
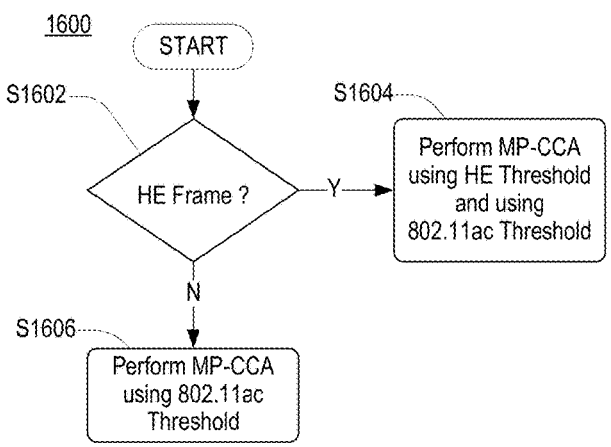
FIG. 16 illustrates another process for controlling a behavior of an HE station having more than one mid-packet CCA threshold, according to an embodiment.

FIG. 16 illustrates another process 1600 for controlling a behavior of an HE station having more than one mid-packet detection CCA threshold.

At S1602, the process 1600 determines whether a frame to be transmitted is an HE frame. When the frame to be transmitted is the HE frame, the process 1600 proceeds to S1604. Otherwise, at S1602 the process 1600 proceeds to S1606.

At S1604, the process 1600 performs MP CCA using an applicable threshold prescribed in IEEE 802.11ac (that is, a threshold for symbols generated using a 64-point Fast Fourier Transform (FFT) and having a symbol duration of 3.2 µs) and also using a threshold according to 802.11ax (that is, a threshold for symbols generated using a 256-point FFT and having a symbol duration of 12.8 µs).

At S1606 the process 1600 performs MP CCA using the applicable threshold prescribed in IEEE 802.11ac and does not perform MP CCA using the threshold according to 802.11ax.

Figure 17:
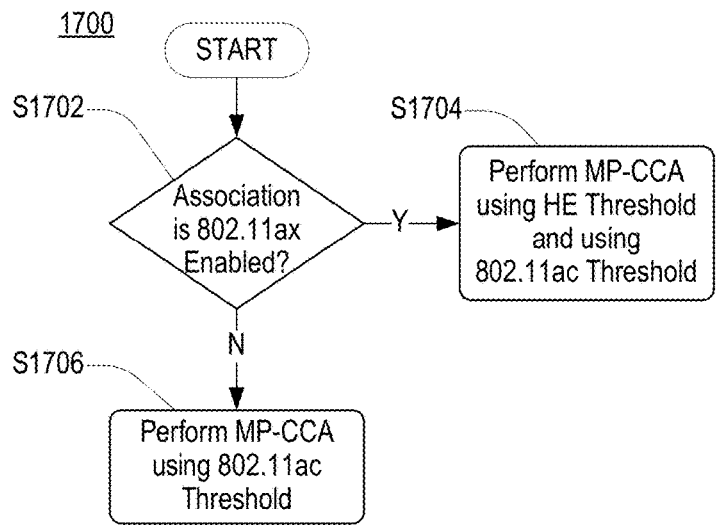
FIG. 17 illustrates another process for controlling a behavior of an HE station having more than one mid-packet CCA threshold, according to an embodiment.

FIG. 17 illustrates another process 1700 for controlling a behavior of an HE station having more than one mid-packet detection CCA threshold.

At S1702, the process 1700 determines whether an association of the HE station with another stations has features of IEEE 802.11ax enabled. When the association has the IEEE 802.11ax features enabled, the process 1700 proceeds to S1704. Otherwise, at S1702 the process 1700 proceeds to S1706.

At S1704, the process 1700 performs MP CCA using an applicable threshold prescribed in IEEE 802.11ac (that is, a threshold for symbols generated using a 64-point Fast Fourier Transform (FFT) and having a symbol duration of 3.2 µs) and also using a threshold according to 802.11ax (that is, a threshold for symbols generated using a 256-point FFT and having a symbol duration of 12.8 µs). The process 1700 may perform MP CCA using the threshold according to 802.11ax regardless of the type of frame to be transmitted.

At S1706 the process 1700 performs MP CCA using the applicable threshold prescribed in IEEE 802.11ac and does not perform MP CCA using the threshold according to 802.11ax.

Figure 18:
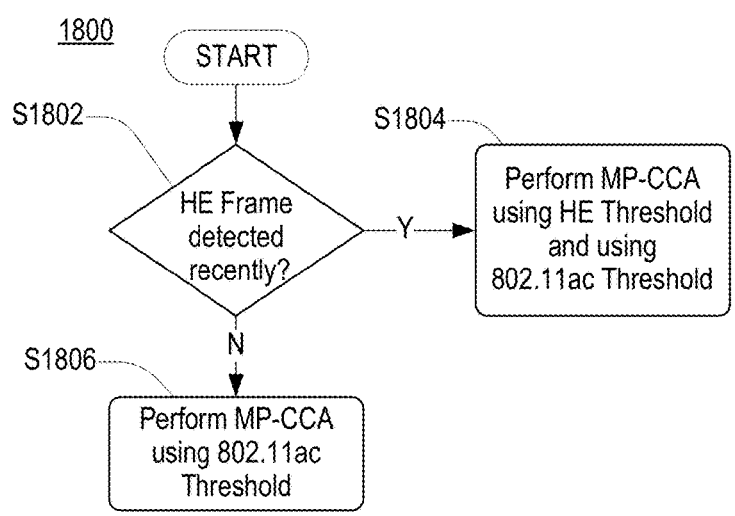
FIG. 18 illustrates another process for controlling a behavior of an HE station having more than one mid-packet CCA threshold, according to an embodiment.

FIG. 18 illustrates another process 1800 for controlling a behavior of an HE station having more than one mid-packet detection CCA threshold. The process 1800 maintains a receive history indicating whether frames received by the HE stations are HE frames.

At S1802, the process 1800 determines whether the receive history indicates that an HE frame was received within a predetermined period relative to the present time. When the receive history indicates that the HE frame was received within the predetermined period, the process 1800 proceeds to S1804. Otherwise, at S1802 the process 1800 proceeds to S1806.

At S1804, the process 1800 performs MP CCA using an applicable threshold prescribed in IEEE 802.11ac (that is, a threshold for symbols generated using a 64-point Fast Fourier Transform (FFT) and having a symbol duration of 3.2 µs) and also using a threshold according to 802.11ax (that is, a threshold for symbols generated using a 256-point FFT and having a symbol duration of 12.8 µs). The process 1800 may perform MP CCA using the threshold according to 802.11ax regardless of the type of frame to be transmitted.

At S1806 the process 1800 performs MP CCA using the applicable threshold prescribed in IEEE 802.11ac and does not perform MP CCA using the threshold according to 802.11ax.

In an embodiment, a mid-packet detection scheme may have an increased window size for mid-packet CCA relative to a legacy device, and a behavior of an HE station may be adapted to the increased window size.

In an embodiment, a CCA threshold for mid-packet CCA may be adjusted to be suitable for use with an increased symbol duration, and a behavior of an HE station may be adapted to the adjusted CCA threshold.

The above explanation and figures are applied to an HE station, an HE frame, an HE PPDU, an HE-SIG field and the like of the IEEE 802.11ax amendment, but they can also applied to a receiver, a frame, PPDU, a SIG field, and the like of the next amendment of IEEE 802.11. Furthermore, some embodiments have been described with respect to a secondary channel, but embodiments are not limited thereto.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method implemented by a transmitting device for performing mid-packet detection in a wireless channel, the method comprising:
   receiving, by the transmitting device, a signal through the wireless channel;
   detecting, using a first autocorrelation of the signal, one or more first symbols having a first symbol duration in the signal during a first detection window; and
   detecting, using a second autocorrelation of the signal, one or more second symbols having a second symbol duration in the signal during a second detection window, determining whether the wireless channel is idle or busy during the first detection window using the results of detecting the one or more first symbols;
   when the wireless channel is determined to be busy during the first detection window, preventing the transmitting device from transmitting using the wireless channel; and
   when the wireless channel is determined to be idle during the first detection window: determining whether the wireless channel is idle or busy during the second detection window using the results of detecting the one or more second symbols,
   when the wireless channel is determined to be idle during the second detection window, permitting the transmitting device to transmit either a High Efficiency (HE) frame or a Very High Throughput (VHT) frame, and
   when the wireless channel is determined to be busy during the second detection window, permitting the transmitting device to transmit the VHT frame and preventing the transmitting device from transmitting the HE frame.

2. The method of claim 1, wherein a duration of the first detection window is 25 microseconds, and a duration of the second detection window is greater than the duration of the first detection window.

3. The method of claim 2, wherein the duration of the second detection window is less than a duration of a Distributed Coordination Function (DCF) InterFrame Space (DIFS).

4. The method of claim 3, wherein the duration of the second detection window is in the range of 25 to 30 microseconds.

5. The method of claim 2, wherein the first detection window occurs during the duration of the second detection window.

6. The method of claim 2, wherein the second detection window occurs during the duration of a Distributed Coordination Function (DCF) InterFrame Space (DIFS).

7. The method of claim 1, wherein the first symbol duration is 3.2 microseconds excluding a first Cyclic Prefix (CP), and the second symbol duration is 12.8 microseconds excluding a second CP.

8. The method of claim 1, wherein permitting the transmitting device to transmit the VHT frame includes permitting the transmitting device to transmit either the VHT frame or a High Throughput (HT) frame.

9. The method of claim 1, further comprising:
   determining whether the wireless channel is idle or busy during the first detection window according to a first threshold; and
   determining whether the wireless channel is idle or busy during the second detection window according to a second threshold, the second threshold being different from the first threshold.

10. The method of claim 1, further comprising:
    performing the first autocorrelation according to the first symbol duration; and
    performing the second autocorrelation according to the second symbol duration.

11. A method implemented by a transmitting device for performing mid-packet detection in a wireless channel, the method comprising:
    receiving, by the transmitting device, a signal through the wireless channel;
    detecting, using a first autocorrelation of the signal, one or more first symbols having a first symbol duration in the signal during a first detection window; and
    detecting, using a second autocorrelation of the signal, one or more second symbols having a second symbol duration in the signal during a second detection window;
    determining whether the transmitting device is associated with a High Efficiency (HE) Access Point (AP);
    when the transmitting device is associated with the HE AP:
    determining whether the wireless channel is idle or busy during the second detection window using the results of detecting the one or more second symbols;
    when the wireless channel is determined to be idle during the second detection window, permitting the transmitting device to transmit either a High Efficiency (HE) frame or a Very High Throughput (VHT) frame; and
    when the wireless channel is determined to be busy during the second detection window, preventing the transmitting device from transmitting using the wireless channel; and
    when the transmitting device is not associated with the HE AP:
    determining whether the wireless channel is idle or busy during the first detection window using the results of detecting the one or more first symbols;
    when the wireless channel is determined to be idle during the first detection window, permitting the transmitting device to transmit the VHT frame and preventing the transmitting device from transmitting the HE frame; and
    when the wireless channel is determined to be busy during the first detection window, preventing the transmitting device from transmitting using the wireless channel.

12. The method of claim 11, wherein a duration of the first detection window is 25 microseconds, and a duration of the second detection window is greater than the duration of the first detection window.

13. The method of claim 12, wherein the duration of the second detection window is less than a duration of a Distributed Coordination Function (DCF) InterFrame Space (DIFS).

14. The method of claim 13, wherein the duration of the second detection window is in the range of 25 to 30 microseconds.

15. The method of claim 12, wherein the first detection window occurs during the duration of the second detection window.

16. The method of claim 12, wherein the second detection window occurs during the duration of a Distributed Coordination Function (DCF) InterFrame Space (DIFS).

17. The method of claim 11, wherein the first symbol duration is 3.2 microseconds excluding a first Cyclic Prefix (CP), and the second symbol duration is 12.8 microseconds excluding a second CP.

18. The method of claim 11, further comprising:
   determining whether the wireless channel is idle or busy during the first detection window according to a first threshold; and
   determining whether the wireless channel is idle or busy during the second detection window according to a second threshold, the second threshold being different from the first threshold.

19. The method of claim 11, further comprising:
   performing the first autocorrelation according to the first symbol duration; and
   performing the second autocorrelation according to the second symbol duration.

* * * * *